United States Patent
Zhang

(10) Patent No.: US 11,029,454 B2
(45) Date of Patent: Jun. 8, 2021

(54) DIFFUSION SHEET HAVING SELF-LUBRICATING PARTICLES AND DIFFUSION PARTICLES, METHOD FOR FABRICATING THE SAME, BACKLIGHT MODULE, AND DISPLAY DEVICE

(71) Applicants: BOE Technology Group Co., Ltd., Beijing (CN); Hefei BOE Vision-Electronic Technology Co., Ltd., Hefei (CN)

(72) Inventor: Yu Zhang, Beijing (CN)

(73) Assignees: BOE Technology Group Co., Ltd., Beijing (CN); Hefei BOE Vision-Electronic Technology Co.,Ltd., Anhui (CN)

( * ) Notice: Subject to any disclaimer, the term of this patent is extended or adjusted under 35 U.S.C. 154(b) by 142 days.

(21) Appl. No.: 16/208,682

(22) Filed: Dec. 4, 2018

(65) Prior Publication Data

US 2019/0324174 A1  Oct. 24, 2019

(30) Foreign Application Priority Data

Apr. 19, 2018  (CN) .......................... 201810352593.6

(51) Int. Cl.
*G02B 5/02* (2006.01)
*F21V 8/00* (2006.01)

(52) U.S. Cl.
CPC ......... *G02B 5/0268* (2013.01); *G02B 5/0226* (2013.01); *G02B 5/0242* (2013.01); *G02B 6/0051* (2013.01); *G02B 6/0065* (2013.01); *G02B 5/0278* (2013.01)

(58) Field of Classification Search
CPC .. G02B 5/0215; G02B 5/0221; G02B 5/0226; G02B 5/0242; G02B 5/0268; G02B 5/0278; G02B 6/0051; G02B 6/0065
USPC ......................................................... 359/599
See application file for complete search history.

(56) References Cited

U.S. PATENT DOCUMENTS

| | | | |
|---|---|---|---|
| 2008/0057297 A1* | 3/2008 | Hatakeyama | G02B 5/0278 428/325 |
| 2010/0112296 A1* | 5/2010 | Yoshihara | G02B 1/10 428/172 |
| 2010/0245717 A1* | 9/2010 | Miyamoto | G02B 6/0051 349/65 |

FOREIGN PATENT DOCUMENTS

| | | | |
|---|---|---|---|
| CN | 106009875 A | * | 10/2016 |
| CN | 106707378 A | | 5/2017 |
| CN | 106772724 A | | 5/2017 |

OTHER PUBLICATIONS

English translation of CN 106009875 A, retrieved from https://worldwide.espacenet.com/ on Jun. 21, 2020 (Year: 2016).*

* cited by examiner

*Primary Examiner* — Ryan S Dunning
(74) *Attorney, Agent, or Firm* — Arent Fox LLP; Michael Fainberg

(57) ABSTRACT

The disclosure discloses a diffusion sheet, a method for fabricating the same, a backlight module, and a display device, and the diffusion sheet includes: a substrate; and a diffusion layer arranged on a side of the substrate, wherein the diffusion layer includes a first base layer, and a plurality of diffusion particles and a plurality of self-lubricating particles distributed in the first base layer.

17 Claims, 1 Drawing Sheet

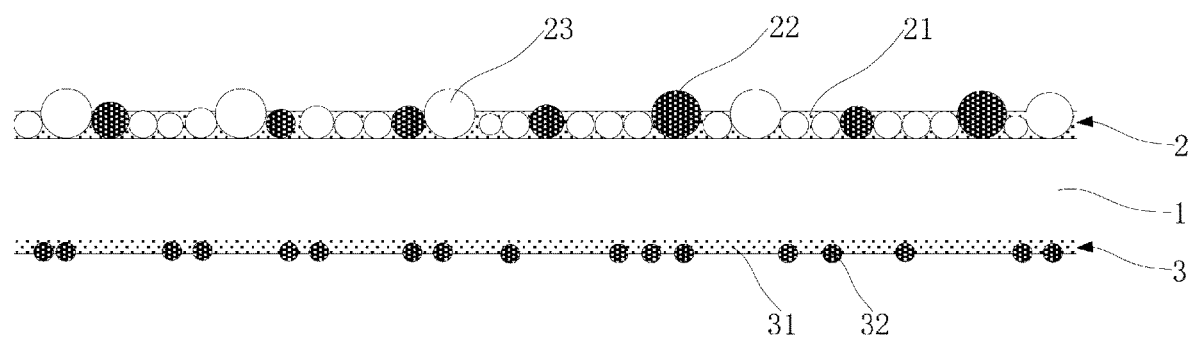

DIFFUSION SHEET HAVING SELF-LUBRICATING PARTICLES AND DIFFUSION PARTICLES, METHOD FOR FABRICATING THE SAME, BACKLIGHT MODULE, AND DISPLAY DEVICE

CROSS-REFERENCE TO RELATED APPLICATION

This Application claims priority to Chinese Patent Application No. 201810352593.6, filed on Apr. 19, 2018, the content of which is incorporated by reference in the entirety.

TECHNICAL FIELD

This disclosure relates to the field of display technologies, and particularly to a diffusion sheet, a method for fabricating the same, a backlight module, and a display device.

DESCRIPTION OF THE RELATED ART

At present, liquid crystal displays are still a predominant choice in the market of TV sets and displays, and their share in the market is also growing annually. Generally, a liquid crystal display typically includes a liquid crystal screen and a backlight module, where the backlight module is configured to provide a stable light source with uniform and sufficient brightness. The backlight module generally includes a Light Emitting Diode (LED) lamp strip, a reflector plate, optical films, etc., where the diffusion sheet, which is an optical film, is configured to convert a point light source into a surface light source according to different refractive indexes of diffusion particles on a surface thereof to thereby provide the liquid crystal display with a uniform surface light source.

SUMMARY

Embodiments of the disclosure provide a diffusion sheet, a method for fabricating the same, a backlight module, and a display device.

In an aspect, the embodiments of the disclosure provide a diffusion sheet including: a substrate, and a diffusion layer arranged on a side of the substrate; wherein the diffusion layer includes a first base layer, and a plurality of diffusion particles and a plurality of self-lubricating particles distributed in the first base layer.

In some embodiments, the plurality of self-lubricating particles are modified graphene particles.

In some embodiments, a modified material on a surface of each of the modified graphene particles includes one or more of hydroxyl acrylamide, allyl glycidyl ether, or acrylic acid.

In some embodiments, the plurality of self-lubricating particles and the plurality of diffusion particles are distributed in the first base layer at a uniform interval.

In some embodiments, the plurality of diffusion particles account for 20% to 30% of a total mass of the diffusion layer, and the plurality of self-lubricating particles account for 10% to 15% of the total mass of the diffusion layer.

In some embodiments, particle sizes of the plurality of self-lubricating particles, and particle sizes of the plurality of diffusion particles lie in a same range.

In some embodiments, the plurality of diffusion particles includes a plurality of first diffusion particles and/or a plurality of second diffusion particles; wherein particle sizes of the plurality of the first diffusion particles lie in a different range with from that of particle sizes of the plurality of the second diffusion particles.

In some embodiments, a particle size of each of the plurality of first diffusion particles is greater than or equal to 15 μm and less than or equal to 25 μm.

In some embodiments, a particle size of each of the plurality of second diffusion particles is greater than 25 μm and less than or equal to 35 μm.

In some embodiments, the plurality of diffusion particles are spherical or ellipsoidal organic diffusion molecules, and shapes of the plurality of self-lubricating particles are same as that of the plurality of diffusion particles.

In some embodiments, a material of each of the plurality of diffusion particles includes one or more of polymethyl methacrylate, polyethyl methacrylate, polystyrene, or siloxane resin.

In some embodiments, the first base layer includes water-soluble resin and a functional additive, wherein the water-soluble resin includes acrylic resin, and the functional additive includes a dispersant, a cross-linking agent, a defoamer, and an antistatic agent.

In some embodiments, the diffusion sheet further includes a protective coating arranged on a side of the substrate facing away from the diffusion layer, and the protective coating includes a second base layer, and a plurality of third diffusion particles distributed in the second base layer.

In some embodiments, a particle size of each of the plurality of third diffusion particles is greater than or equal to 0.5 μm and less than or equal to 10 μm.

In some embodiments, a size of the first base layer in a direction perpendicular to a surface of the substrate is one-half to three-fourths of a particle size of a diffusion particle with a largest particle size among the plurality of diffusion particles.

In another aspect, the embodiments of the disclosure further provide a backlight module, including the diffusion sheet according to the embodiments of the disclosure.

In still another aspect, the embodiments of the disclosure further provide a display device, including the backlight module according to the embodiments of the disclosure.

In a further aspect, the embodiments of the disclosure further provide a method for fabricating the diffusion sheet according to the embodiments of the disclosure, the method including: providing the substrate; coating diffusion coating fluid uniformly on the substrate to form a diffusion coating; and heat curing the diffusion coating to form the diffusion layer, wherein the diffusion layer includes the first base layer formed on the substrate, and the plurality of diffusion particles and the plurality of self-lubricating particles distributed in the first base layer.

In some embodiments, before coating diffusion coating fluid uniformly on the substrate to form a diffusion coating, the method further includes: mixing sufficiently an acrylic emulsion accounting for 40% to 60% of a total mass, diffusion particles accounting for 20% to 30% of the total mass, self-lubricating particles accounting for 10% to 15% of the total mass, and a functional additive accounting for 0.5% to 3% of the total mass into a mixture, and diffusing the mixture at a high speed to form the diffusion coating fluid.

In some embodiments, heat curing the diffusion coating includes: heat curing the diffusion coating for 1 to 10 hours at temperature of 80° C. to 160° C.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

FIG. 1 is a schematic structural diagram of a diffusion sheet according to the embodiments of the disclosure.

DETAILED DESCRIPTION OF THE EMBODIMENTS

At present, TV sets and display products may inevitably vibrate while being transported so that friction tends to occur between optical films and a display screen, or between the optical films, so powder may fall onto surfaces of the optical films as a result of scratching, thus resulting in bright specks and spots on the display products. In the related art, in order to avoid the problem of scratching arising from a friction between a diffusion sheet and another film, a particle size distribution of diffusion particles on a surface of the diffusion sheet is extended to thereby improve the compressibility of the diffusion particles, so the diffusion particles can be alleviated from falling off during the friction, but the anti-scratching performance of the diffusion sheet has been improved so insignificantly that a display defect arising from scratching the diffusion sheet due to the friction has remained unaddressed.

The technical solutions according to the embodiments of the disclosure will be described below clearly and fully with reference to the drawings in the embodiments of the disclosure, and apparently the embodiments to be described are only a part but not all of the embodiments of the disclosure. Based upon the embodiments here of the disclosure, all the other embodiments which can occur to those ordinarily skilled in the art without any inventive effort shall fall into the claimed scope of the disclosure.

As illustrated in FIG. 1, a diffusion sheet according to the embodiments of the disclosure includes: a substrate 1, and a diffusion layer 2 arranged on a side of the substrate 1; where the diffusion layer 2 includes a first base layer 21, and a plurality of diffusion particles 22 and a plurality of self-lubricating particles 23 distributed in the first base layer 21.

In the diffusion sheet above according to the embodiments of the disclosure, both the plurality of diffusion particles 22 and the plurality of self-lubricating particles 23 are distributed in the diffusion layer 2 on a surface of the diffusion sheet, the plurality of diffusion particles 22 are distributed in the diffusion layer 2 so that they can diffuse light rays to thereby guarantee good optical performance of the diffusion sheet, and the plurality of self-lubricating particles 23 are distributed in the diffusion layer 2 so that they can lower in effect a friction coefficient on the surface of the diffusion sheet, and when the diffusion sheet comes into contact with another film, the friction between the diffusion sheet and the other film can be alleviated to thereby improve the anti-scratching performance of the diffusion sheet, and provide the diffusion sheet with the effect of self-lubricating and anti-scratching so as to protect the diffusion sheet, to improve the good yield of the display product, and to lower a production cost.

In some embodiments, the plurality of self-lubricating particles 23 are embodied as modified graphene particles. Since there is a cross-linking between the modified graphene particles and the first base layer 21, thereby their adhesion to the first base layer 21 can be improved so as to improve their stability in the diffusion sheet.

In some embodiments, a modified material on a surface of each of the modified graphene particles includes one or more of hydroxyl acrylamide, allyl glycidyl ether, or acrylic acid, that is, the surfaces of the modified graphene particles are modified with one or more of hydroxyl acrylamide, allyl glycidyl ether, or acrylic acid to thereby form a highly stable self-lubricating coating with an extremely low surface friction coefficient on the surfaces of the modified graphene particles, so that the graphene particles can have good thermal conductivity, thermal dissipation, and hydrophilicity, and the surfaces of the modified graphene particles can have an extremely low friction coefficient to thereby further improve the anti-scratching performance of the diffusion sheet.

In some embodiments, the plurality of self-lubricating particles 23 and the plurality of diffusion particles 22 are distributed in the first base layer 21 at a uniform interval, for example, the plurality of self-lubricating particles 23 and the plurality of diffusion particles 22 are alternately distributed in the first base layer 21 at a uniform interval.

In some embodiments, the plurality of diffusion particles 22 account for 20% to 30% of a total mass of the diffusion layer 2, and the plurality of self-lubricating particles 23 account for 10% to 15% of the total mass of the diffusion layer 2. Since a reasonable proportion of the contents of the plurality of diffusion particles 22 and the plurality of self-lubricating particles 23 is set as described above, the self-lubricating property of the diffusion layer 2 can be further improved, so as to further improve the anti-scratching performance of the diffusion sheet.

In some embodiments, particle sizes of the plurality of self-lubricating particles 23, and particle sizes of the plurality of diffusion particles 22 lie in the same range to thereby facilitate the fabrication of the diffusion layer 2.

In some embodiments, a particle size of each of the plurality of diffusion particles 22 is greater than or equal to 15 μm and less than or equal to 35 μm, and since the particle sizes of the plurality of self-lubricating particles 23 and the particle sizes of the plurality of diffusion particles 22 lie in the same range, a particle size of each of the plurality of self-lubricating particles 23 is also greater than or equal to 15 μm and less than or equal to 35 μm, so that ranges of the particle sizes of the plurality of self-lubricating particles 23 and the plurality of diffusion particles 22 can be adapted as appropriate to an overall arrangement of the diffusion layer 2 to thereby further improve the self-lubricating effect of the diffusion layer 2.

In some embodiments, the particle size of each of the plurality of diffusion particles 22 is greater than or equal to 15 μm and less than or equal to 25 μm, and/or, the particle size of each of the plurality of diffusion particles 22 is greater than 25 μm and less than or equal to 35 μm. That is, the plurality of diffusion particles 22 may include a plurality of first diffusion particles and/or a plurality of second diffusion particles, where a particle size of each of the plurality of first diffusion particles is greater than or equal to 15 μm and less than or equal to 25 μm, and a particle size of each of the plurality of second diffusion particles is greater than 25 μm and less than or equal to 35 μm. Stated otherwise, the plurality of diffusion particles 22 may include only the first diffusion particles or the second diffusion particles to thereby facilitate the fabrication of the diffusion layer 2; or the plurality of diffusion particles 22 may alternatively include both the first diffusion particles and the second diffusion particles with their particle sizes lying in two ranges respectively, that is, the plurality of diffusion particles 22 include both the diffusion particles with larger particle sizes, and the diffusion particles with smaller particle sizes to thereby improve the light-diffusing effect of the diffusion particles 22 so as to improve the optical performance of the diffusion sheet according to the embodiments of the disclosure.

In some embodiments, since the particle sizes of the plurality of self-lubricating particles 23 lie in the same range as the particle sizes of the plurality of diffusion particles 22, the plurality of self-lubricating particles 23 may include first self-lubricating particles with particle sizes ranging from 15 µm to 25 µm, or second self-lubricating particles with particle sizes greater than 25 µm and less than or equal to 35 µm; or the plurality of self-lubricating particles 23 may alternatively include both the first self-lubricating particles and the second self-lubricating particles with their particle sizes lying in two ranges respectively.

Where the particle sizes of the first self-lubricating particles are set substantially the same as or slightly different from the particle sizes of the first diffusion particles, or the particle sizes of the first self-lubricating particles are set the same as the particle sizes of the first diffusion particles; and alike, the particle sizes of the second self-lubricating particles are set substantially the same as or slightly different from the particle sizes of the second diffusion particles, or the particle sizes of the second self-lubricating particles are set the same as the particle sizes of the second diffusion particles. It shall be noted that, if the particle sizes of the particles are set the same, then no error will be considered, but there is some difference in particle size between the self-lubricating particles 23 and the diffusion particles 22 with their particle sizes corresponding to each other under an actual fabrication process condition, that is, the particle sizes of the self-lubricating particles 23 are very approximately to and substantially the same as those of the diffusion particles 22 with particle sizes corresponding thereto.

In some embodiments, the plurality of diffusion particles 22 are spherical or ellipsoidal organic diffusion molecules, where the plurality of diffusion particles 22 are arranged to be spherical or ellipsoidal to thereby improve the effect of light diffusion; and the plurality of self-lubricating particles 23 are arranged to be spherical or ellipsoidal in the same shapes as the shapes of the plurality of diffusion particles 22 to thereby facilitate the fabrication of the diffusion layer 2 so as to improve the self-lubricating effect of the diffusion layer 2.

In some embodiments, a material of each of the plurality of diffusion particles 22 includes one or more of polymethyl methacrylate, polyethyl methacrylate, polystyrene, or siloxane resin.

In some embodiments, in the diffusion sheet above according to the embodiments of the disclosure, the first base layer 21 includes water-soluble resin and a functional additive, where the water-soluble resin includes acrylic resin, and the functional additive includes a dispersant, a cross-linking agent, a defoamer, and an antistatic agent.

In some embodiments, the diffusion sheet further includes a protective coating 3 arranged on a side of the substrate 1 facing away from the diffusion layer 2. The protective coating 3 is arranged on the side of the substrate 1 facing away from the diffusion layer 2 to protect the diffusion sheet so as to guarantee the performance of the diffusion sheet.

In some embodiments, the protective coating 3 includes a second base layer 31, and a plurality of third diffusion particles 32 distributed in the second base layer 31.

In some embodiments, in the protective coating 3, a particle size of each of the plurality of third diffusion particles 32 is greater than or equal to 0.5 µm and less than or equal to 10 µm.

In some embodiments, in the diffusion sheet above according to the embodiments of the disclosure, a size of the first base layer 21 in a direction perpendicular to a surface of the substrate 1 is one-half to three-fourths of a particle size of each diffusion particle 22 with the largest particle size among the plurality of diffusion particles 22. The particle size of each diffusion particle 22 with the largest particle size among the plurality of diffusion particles 22 is larger than a thickness of the first base layer 21, that is, each diffusion particle 22 with the largest particle size is distributed in the first base layer 21 at a height higher than a surface of the first base layer 21 by one fourth to one second of its particle size. Further, the particle sizes of the plurality of self-lubricating particles 23 lie in the same range as the particle sizes of the plurality of diffusion particles 22, so particle sizes of at least a part of the plurality of self-lubricating particles 23 lie in the same range as the particle size of each diffusion particle 22 with the largest particle size among the plurality of diffusion particles 22, so at least the part of the self-lubricating particles 23 are distributed in the first base layer 21 above the surface of the first base layer 21 to thereby further lower the friction coefficient of the surface of the diffusion layer 2 so as to further improve the anti-scratching performance of the diffusion sheet.

In some embodiments, in the diffusion sheet above according to the embodiments of the disclosure, the substrate 1 is a transparent substrate. Further, a thickness of the substrate 1 ranges from 10 µm to 300 µm, for example, ranges from 30 µm to 100 µm or 100 µm to 200 µm. It shall be noted that, the thickness of the substrate 1 can be selected as needed under an actual application condition, although the embodiments of the disclosure will not be limited thereto.

In some embodiments, a refractive index of the substrate 1 ranges from 1.4 to 1.75, and a material of the substrate 1 can be one of polycarbonate, polyethylene terephthalate, polyamide resin, polystyrene, polyethylene, or polymethyl methacrylate.

Based upon the same inventive concept, the embodiments of the disclosure further provide a backlight module including the diffusion sheet according to any one of the above embodiments of the disclosure. Since the backlight module addresses the problem under a similar principle to the diffusion sheet, reference can be made to the implementation of the diffusion sheet for an implementation of the backlight module, so a repeated description thereof will be omitted here.

Based upon the same inventive concept, the embodiments of the disclosure further provide a display device including the backlight module according to any one of the above embodiments of the disclosure. The display device can be a mobile phone, a tablet computer, a TV set, a monitor, a notebook computer, a digital photo frame, a navigator, or any other product or component with a display function. All the other components indispensable to the display device shall readily occur to those ordinarily skilled in the art, and a repeated description thereof will be omitted here, but the embodiments of the disclosure will not be limited thereto. Further, since the display device addresses the problem under a similar principle to the backlight module, reference can be made to the embodiments of the backlight module above for an implementation of the display device, and a repeated description thereof will be omitted here.

Based upon the same inventive concept, the embodiments of the disclosure further provide a method for fabricating a diffusion sheet, where the method includes: providing a substrate 1, coating diffusion coating fluid uniformly on the substrate 1 to form a diffusion coating, and heat curing the diffusion coating to form a diffusion layer 2; where the diffusion layer 2 includes a first base layer 21, and a plurality of diffusion particles 22 and a plurality of self-lubricating particles 23 distributed in the first base layer 21.

The self-lubricating particles 23 are arranged in the diffusion layer 2 fabricated using the method above for fabricating the diffusion sheet to thereby lower in effect a friction coefficient on a surface of the diffusion sheet, and improve the anti-scratching performance of the diffusion sheet so as to improve a good yield of the display product, and to lower a production cost.

In some embodiments, before the diffusion coating fluid is coated uniformly on the substrate 1 to form the diffusion layer 2, the method further includes preparing the diffusion coating fluid by: mixing an acrylic emulsion accounting for 40% to 60% of a total mass, diffusion particles 22 accounting for 20% to 30% of the total mass, self-lubricating particles 23 accounting for 10% to 15% of the total mass, and a functional additive accounting for 0.5% to 3% of the total mass into a mixture sufficiently, and diffusing the mixture at a high speed to form the diffusion coating fluid.

In some embodiments, after the components are sufficiently mixed into the mixture at the proportion above, the mixture can be diffused for 30 minutes using a high-speed diffuser to form the diffusion coating fluid. Here it shall be noted that, the percentages of the respective components in the operation above of preparing the diffusion coating fluid refer to their percentages among the total mass of the diffusion coating fluid.

In some embodiments, heat curing the diffusion coating includes: heat curing the diffusion coating for 1 to 10 hours at temperature of 80° C. to 160° C.

In some embodiments, the method above further includes: forming a protective coating 3 on a side of the substrate 1 facing away from the diffusion layer 2.

Evidently those skilled in the art can make various modifications and variations to the disclosure without departing from the spirit and scope of this disclosure. Thus the disclosure is also intended to encompass these modifications and variations thereto so long as the modifications and variations come into the scope of the claims appended to the disclosure and their equivalents.

The invention claimed is:

1. A diffusion sheet comprising:
a substrate; and
a diffusion layer arranged on a side of the substrate, wherein the diffusion layer comprises a first base layer, and a plurality of diffusion particles distributed in the first base layer and a plurality of self-lubricating particles distributed in the first base layer, the plurality of diffusion particles being different in composition from the plurality of self-lubricating particles;
wherein:
a largest particle size among the plurality of self-lubricating particles is equal to a largest particle size among the plurality of diffusion particles, and a smallest particle size among the plurality of self-lubricating particles is equal to a smallest particle size among the plurality of diffusion particles;
the diffusion sheet further comprises a protective coating arranged on a side of the substrate facing away from the diffusion layer, and the protective coating comprises a second base layer, and a plurality of third diffusion particles distributed in the second base layer; and
a size of the first base layer in a direction perpendicular to a surface of the substrate is one-half to three-fourths of a particle size of a diffusion particle with a largest particle size among the plurality of diffusion particles.

2. The diffusion sheet according to claim 1, wherein the plurality of self-lubricating particles are modified graphene particles.

3. The diffusion sheet according to claim 2, wherein a modified material on a surface of each of the modified graphene particles comprises one or more of hydroxyl acrylamide, allyl glycidyl ether, or acrylic acid.

4. The diffusion sheet according to claim 1, wherein the plurality of self-lubricating particles and the plurality of diffusion particles are distributed in the first base layer at a uniform interval.

5. The diffusion sheet according to claim 1, wherein the plurality of diffusion particles account for 20% to 30% of a total mass of the diffusion layer, and the plurality of self-lubricating particles account for 10% to 15% of the total mass of the diffusion layer.

6. The diffusion sheet according to claim 1, wherein the plurality of diffusion particles are spherical or ellipsoidal organic diffusion molecules, and shapes of the plurality of self-lubricating particles are same as that of the plurality of diffusion particles.

7. The diffusion sheet according to claim 1, wherein a material of each of the plurality of diffusion particles comprises one or more of polymethyl methacrylate, polyethyl methacrylate, polystyrene, or siloxane resin.

8. The diffusion sheet according to claim 1, wherein the first base layer comprises water-soluble resin and a functional additive, wherein the water-soluble resin comprises acrylic resin, and the functional additive comprises a dispersant, a cross-linking agent, a defoamer, and an antistatic agent.

9. The diffusion sheet according to claim 1, wherein a particle size of each of the plurality of third diffusion particles is greater than or equal to 0.5 μm and less than or equal to 10 μm.

10. A backlight module, comprising the diffusion sheet according to claim 1.

11. A display device, comprising the backlight module according to claim 10.

12. A method for fabricating the diffusion sheet according to claim 1, the method comprising:
providing the substrate;
coating diffusion coating fluid uniformly on the substrate to form a diffusion coating; and
heat curing the diffusion coating to form the diffusion layer, wherein the diffusion layer comprises the first base layer formed on the substrate, and the plurality of diffusion particles distributed in the first base layer and the plurality of self-lubricating particles distributed in the first base layer.

13. The method according to claim 12, wherein before coating diffusion coating fluid uniformly on the substrate to form a diffusion coating, the method further comprises:
mixing sufficiently an acrylic emulsion accounting for 40% to 60% of a total mass, diffusion particles accounting for 20% to 30% of the total mass, self-lubricating particles accounting for 10% to 15% of the total mass, and a functional additive accounting for 0.5% to 3% of the total mass into a mixture, and diffusing the mixture at a high speed to form the diffusion coating fluid.

14. The method according to claim 12, wherein heat curing the diffusion coating comprises: heat curing the diffusion coating for 1 to 10 hours at temperature of 80° C. to 160° C.

15. The diffusion sheet according to claim 1, wherein the plurality of diffusion particles comprise a plurality of first diffusion particles and a plurality of second diffusion particles; wherein particle sizes of the plurality of the first diffusion particles lie in a different range from that of particle sizes of the plurality of the second diffusion particles.

16. The diffusion sheet according to claim 15, wherein a particle size of each of the plurality of first diffusion particles is greater than or equal to 15 μm and less than or equal to 25 μm.

17. The diffusion sheet according to claim 15, wherein a particle size of each of the plurality of second diffusion particles is greater than 25 μm and less than or equal to 35 μm.

\* \* \* \* \*